United States Patent [19]

Yamauchi

[11] Patent Number: 4,954,980
[45] Date of Patent: Sep. 4, 1990

[54] HIGH SPEED INPUT/OUTPUT MODULE AND PROGRAMMABLE LOGIC CONTROL DEVICE

[75] Inventor: Takashi Yamauchi, Minamitsuru, Japan

[73] Assignee: Fanuc Ltd., Minamitsuru, Japan

[21] Appl. No.: 330,088

[22] PCT Filed: Aug. 10, 1988

[86] PCT No.: PCT/JP88/00789

§ 371 Date: Mar. 17, 1989

§ 102(e) Date: Mar. 17, 1989

[87] PCT Pub. No.: WO89/01656

PCT Pub. Date: Feb. 23, 1989

[30] Foreign Application Priority Data

Aug. 12, 1987 [JP] Japan .................................. 62-201597

[51] Int. Cl.$^5$ .................................................. G06F 3/00
[52] U.S. Cl. .................................. 364/900; 364/926.9; 364/926.93; 364/949
[58] Field of Search ... 364/200 MS File, 900 MS File; 340/825.8

[56] References Cited

U.S. PATENT DOCUMENTS

| 4,227,247 | 10/1980 | Kinter | 364/900 |
|---|---|---|---|
| 4,455,621 | 6/1984 | Pelley et al. | 364/900 |
| 4,700,326 | 10/1987 | Florine | 364/200 |
| 4,750,113 | 6/1988 | Bugert | 364/200 |
| 4,751,672 | 6/1988 | Yamada | 364/900 |
| 4,751,673 | 6/1988 | Agarwal et al. | 364/900 |
| 4,847,612 | 7/1989 | Kaplinsky | 340/825.8 |

Primary Examiner—Raulfe B. Zache
Attorney, Agent, or Firm—Staas & Halsey

[57] ABSTRACT

A programmable logic control (PLC) device for executing a logical operation process of a sequence for program. The PLC device includes a PLC control unit (10) and a high speed input/output module (20) capable of executing a logical operation at a high speed in response to an external input signal and externally outputting a result of the logical operation, whereby an external signal to be processed at high speed can be processed without using a special processing unit.

5 Claims, 2 Drawing Sheets

HIGH SPEED INPUT/OUTPUT MODULE AND PROGRAMMABLE LOGIC CONTROL DEVICE

BACKGROUND OF THE INVENTION

The present invention relates to a programmable logic control (PLC) device, and more specifically, to a PLC device provided with a high speed input/output module capable of processing an input/output signal at high speed.

A PLC device processes a sequence program by receiving an input signal and outputting an output signal as a result thereof, and repeatedly executes this cycle. A scanning time (process time) of the sequence program is usually about several milliseconds to one hundred milliseconds. Most controls are executed during that time, but some controls must be partially processed at a very high speed, e.g., in a very short time such as one millisecond or less.

Conventionally, a special unit is provided for the high speed processing, wherein a signal is transmitted between the special unit and a PLC device for effecting an overall control.

This special control unit, however, is cumbersome as a system and requires a large space for the installation. Further, an interface between the PLC device and the special unit is complex.

DISCLOSURE OF THE INVENTION

An object of the present invention is to solve the above problems and to provide a PLC device provided with a high speed input/output module capable of processing an input/output signal at a high speed without using a special high speed processing unit.

To solve the above problems, in accordance with a first embodiment of the present invention, there is provided a high speed input/output module used for a PLC device, a numerical control apparatus and the like, comprising a programmable logical operation element which executes a logical operation at high speed in response to an external input signal and an output from a PLC control unit, externally outputting a result of the logical operation, and inputting the result to the PLC control unit.

Further, in accordance with a second embodiment of the present invention, there is provided a PLC device executing a logical operation process of a sequence program by a microprocessor, comprising a programmable logical operation element which includes a high speed input/output module able to execute a logical operation at a high speed in response to an external input signal and an output from a PLC control unit, externally output a result of the logical operation, and input the result to the PLC control unit.

The logical operation element can independently execute a simple operation process, and processes an input/output which must be processed at a high speed, and externally outputs same. When necessary, the element later transmits it to a PLC control unit.

This high speed module is coupled with the PLC device, a numerical control apparatus or the like, and processes an external signal which must be processed at a high speed.

In addition, an arrangement of the PLC device including this high speed module processes the external signal which must be processed at a high speed, without the need for a special processing unit.

DESCRIPTION OF THE PREFERRED EMBODIMENT

An embodiment of the present invention will be hereinafter described in detail with reference to the drawings.

Figure 1:
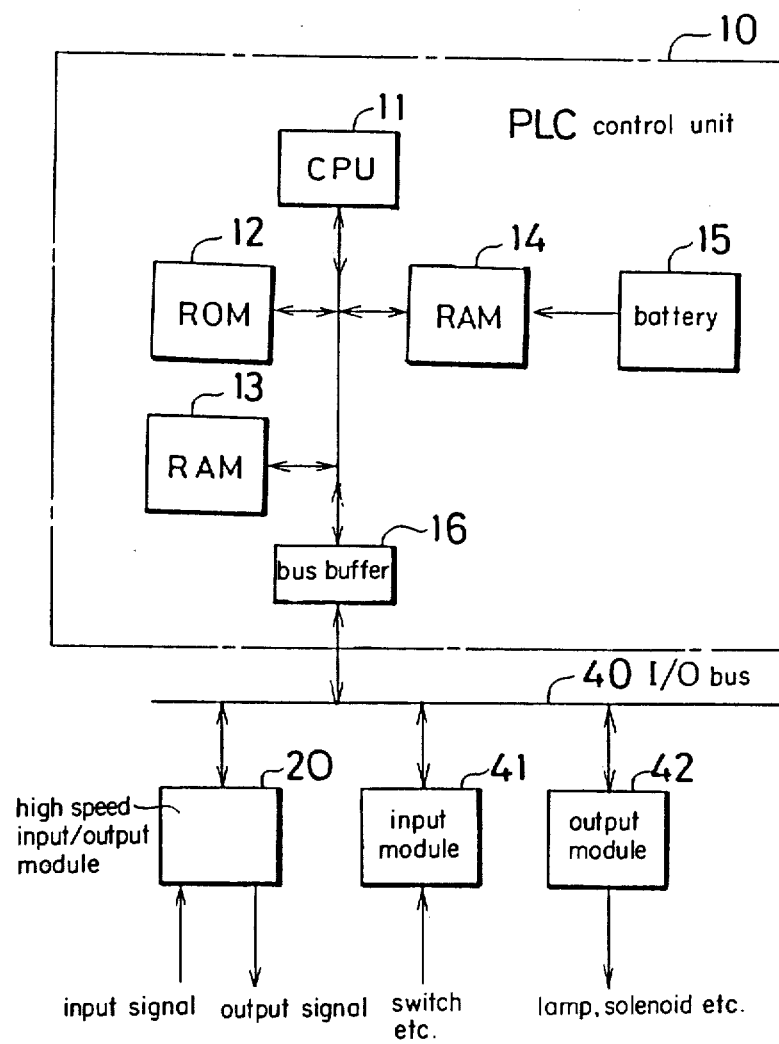
FIG. 1 is a block diagram of an overall PLC device of an embodiment of the present invention.

FIG. 1 is a block diagram of an overall PLC device of an embodiment according to the present invention, wherein 10 designates a PLC control unit as a center for controlling the PLC device 20 designates a high speed input/output module for processing an input/output signal to be processed at high speed, which will be described later in detail, 41 designates an input module for receiving an input signal from a switch or the like and applies the input signal to the PLC control unit through an I/O bus, and 42 designates an output module for receiving an output signal from the PLC control unit 10 through the I/O bus 40, and outputs same to energize a lamp, a solenoid and the like.

Next, the interior of the PLC control unit 10 will be described. Designated at 11 is a microprocessor for controlling the overall PLC device, designated at 12 is a ROM in which a system program is stored. The microprocessor 11 controls the PLC device in accordance with the system program in the ROM 12. Designated at 13 is a RAM for a workpiece in which data and the like is stored, and designatged at 14 is a RAM in which a sequence program and the like for sequence processing is stored. The sequence program is used for regulating the operation of a machine which is actually controlled by the PLC device, and can be changed in midcourse in accordance with a change in the operation of the machine. The RAM 14 is backed up by a battery 15 to maintain the sequence program when a power supply is turned off.

A usual signal, which need not be processed at high speed, is received from the input module 41, processed in accordance with the sequence program, and output from the output module 42. A signal to be processed at high speed is input to the high speed input/output module 20, processed in the interior thereof, and output from the high speed input and output module 20. If necessary, a result of the output is later transmitted to the PLC control unit 10. For example, the signal to be processed at high speed is a signal to be output in correspondence with a signal received from an external absolute encoder mounted on a shaft rotating at high speed.

Figure 2:
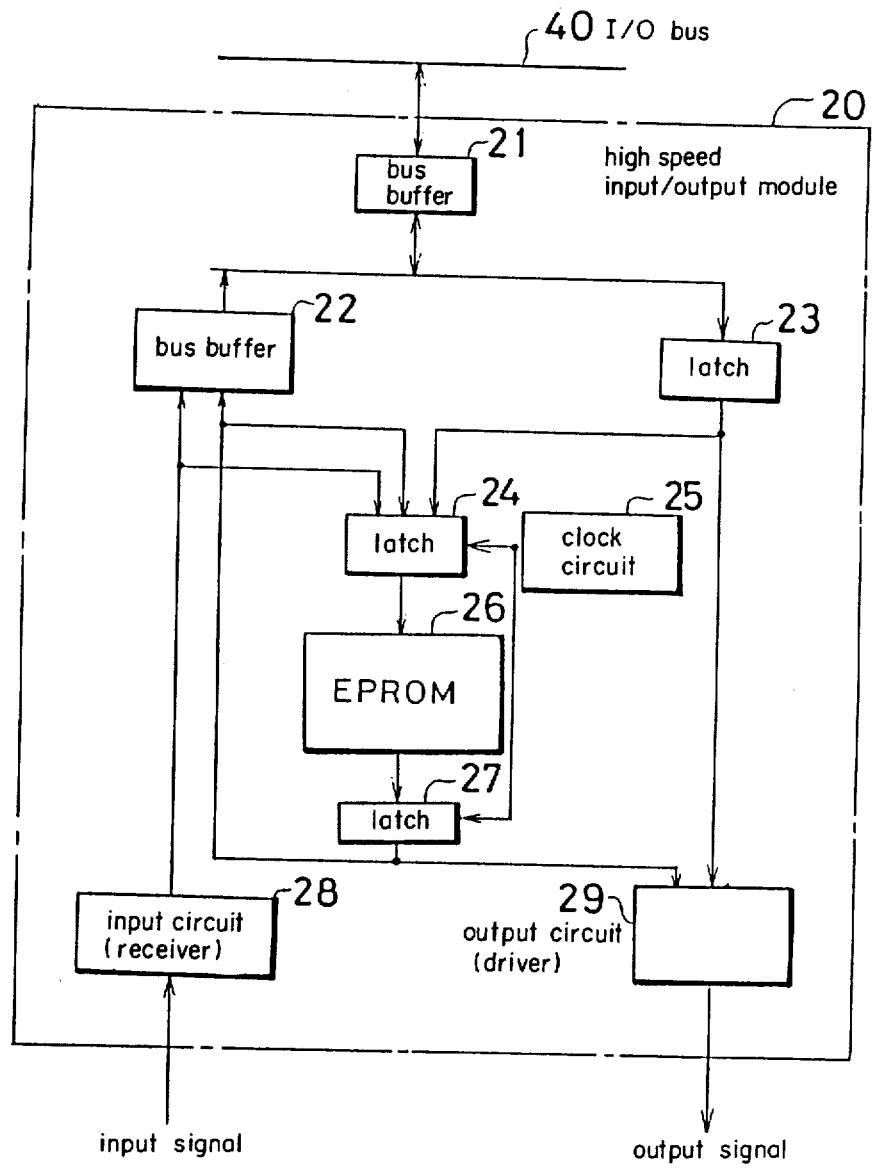
FIG. 2 is a detailed diagram of a high speed input/output module.

Next, the high speed input/output module 20 will be described in detail. FIG. 2 is a detailed diagram of the high speed input/output module 20, wherein 21 designates a buffer as an interface with the I/O bus 40, 22 designates a bus buffer for applying an input signal and the like to the I/O bus 40 through the bus buffer 21, 23 designates a latch for temporarily storing a signal from the PLC control unit 10, 24 designates a latch for storing an input signal and a signal from the latch 23 in synchronism with a clock of a clock circuit 25, 26 designates an EPROM programmed to output a specific output pattern to a certain input to thereby execute a logic operation, 27 designates a latch for storing an output from the EPROM 26 in synchronism with a clock of the clock circuit 25, 28 designates an input circuit comprising a receiver, and 29 designates an output circuit comprising a driver.

Next, the operation of the high speed input/output module 20 will be described. When a signal to be processed at high speed is received by the input circuit 28, the signal is applied to the EPROM 26 through the latch 24, and thus a logical operation predetermined by a program is executed. For example, the EPROM 26 receives a signal from the absolute encoder mounted on the shaft rotating at high speed, as described above, and outputs a pattern signal corresponding to that signal. The output signal from the EPROM 26 is stored in the latch 27 and externally output from the output circuit 29 for controlling an external apparatus at high speed. If the output signal is required by the PLC control unit 10, it is transmitted thereto through the bus buffers 22 and 21.

A signal which need not be processed at high speed is received by the input circuit 28 and transmitted to the PLC control unit 10 as it is, through the bus buffers 22 and 21. Conversely, the usual output is externally output from the output circuit 29 through the bus buffer 21 and the latch 23.

Although the high speed logical operation element is described as an EPROM in the above description, a programmable logic device (PLD) or the like, for example, may be used instead of the EPROM. A RAM also may be used instead of the EPROM, and when a RAM is used, greater flexibility can be provided because a logical operation to be processed at a high speed and an input signal, and the like can be rewritten in response to a command from the PLC control unit 10.

According to the present invention, as described above, since a high speed input/output module is provided which includes a logical operation element capable of processing an input/output signal at high speed, the high speed input/output module can be coupled with a PLC device or the like, instead of a special high speed processing unit, to process an external signal at high speed.

In addition, since the PLC device includes the high speed input/output module provided with the logical operation element capable of processing an input/output signal at high speed, an external signal to be processed at a high speed can be processed without using special high speed processing unit.

I claim:

1. A high speed input/output module for a programmable logical control (PLC) device and a numerical control apparatus, comprising:
   programmable logic control means;
   a programmable logical operation element, operatively connected to said programmable logic control means, for executing a logical operation at high speed in response to an external input signal and an output from said programmable logic control means, for externally outputting a result of the logical operation, and for inputting a result to said programmable logic control means;
   at least one input module, operatively connected to said programmable logic control means, for receiving signals which must not be executed at high speed; and
   at least one output module, operatively connected to said programmable logic control means, for outputting signals at low speed from said programmable logic control means.

2. A high speed input/output module according to claim 1, wherein said logical operation element comprises an EPROM.

3. A high speed input/output module according to claim 1, wherein said logical operation element comprises a programmable logic device (PLD).

4. A high speed input/output module according to claim 1, wherein said logical operation element comprises a RAM.

5. A high speed input/output module according to claim 1, wherein said programmable logic operation element comprises:
   an input circuit for receiving said external input signal;
   a first latch, connected to said input circuit, for storing said external input signal;
   a programmable device, connected to said first latch, for outputting a specific output pattern in accordance with said external input signal;
   a second latch, connected to said programmable device, for storing said specific output pattern; and
   an output circuit, connected to said latch, for outputting said stored specific output pattern.

* * * * *